(12) United States Patent
Roberts et al.

(10) Patent No.: US 7,787,713 B2
(45) Date of Patent: Aug. 31, 2010

(54) INTEGRATED OPTICAL WAVEFORM MODULATION

(75) Inventors: Kim B. Roberts, Nepean (CA); Michel Belanger, Montreal (CA)

(73) Assignee: Ciena Corporation, Linthicum, MD (US)

( * ) Notice: Subject to any disclaimer, the term of this patent is extended or adjusted under 35 U.S.C. 154(b) by 364 days.

(21) Appl. No.: 11/690,444

(22) Filed: Mar. 23, 2007

(65) Prior Publication Data

US 2007/0212076 A1 Sep. 13, 2007

Related U.S. Application Data

(62) Division of application No. 11/357,963, filed on Feb. 22, 2006, now Pat. No. 7,277,603.

(51) Int. Cl.
*G02F 1/035* (2006.01)

(52) U.S. Cl. .......................... 385/1; 385/3
(58) Field of Classification Search .............. None
See application file for complete search history.

(56) References Cited

U.S. PATENT DOCUMENTS

| 5,137,359 | A  | * | 8/1992 | Steele ............... 356/464 |
| 2005/0007642 | A1 | * | 1/2005 | McGhan et al. ....... 359/237 |
| 2006/0078336 | A1 | * | 4/2006 | McNicol et al. ...... 398/147 |

OTHER PUBLICATIONS

Non-Final Office Action for U.S. Appl. No. 12/128,247, dated May 27, 2009; 11 pages.

* cited by examiner

*Primary Examiner*—Omar Rojas
(74) *Attorney, Agent, or Firm*—Christopher & Weisberg, P.A.

(57) ABSTRACT

A method of modulating an optical carrier. A target carrier modulation is computed based on an input data signal. An effective length of an optical modulator is then controlled based on the target carrier modulation.

14 Claims, 5 Drawing Sheets

INTEGRATED OPTICAL WAVEFORM MODULATION

CROSS-REFERENCE TO RELATED APPLICATIONS

This application is a divisional application of U.S. patent application Ser. No. 11/357,963 filed Feb. 22, 2006.

MICROFICHE APPENDIX

Not Applicable.

TECHNICAL FIELD

The present invention relates to optical signal transmitters for optical communications systems, and in particular to integrated optical waveform modulation.

BACKGROUND OF THE INVENTION

In the optical communications space, various techniques are used to synthesize an optical communications signal for transmission. A popular technique utilizes a laser 2 coupled to an external optical modulator 4, as shown in FIG. 1. The laser 2 generates a narrow-band continuous wave (CW) optical carrier signal 6 having a desired wavelength. The optical modulator 4 operates to modulate the amplitude and/or phase the carrier signal 6 to generate the optical communications signal 8 based on a drive signal 10 that encodes data to be transmitted. Typically, the drive signal 10 is generated by a driver circuit 12, which normally provides a power amplifier for amplifying the power of an input digital data signal x(m) to satisfy the input power requirements of the modulator 4.

In the arrangement illustrated in the FIG. 1, the optical modulator 4 is provided by a well known Mach-Zehnder (MZ) interferometer. Other types of modulators may be used, depending on the desired type of modulation. For example, an electro-absorptive modulator (EAM) may be used for amplitude modulation; whereas phase modulators are well known for implementing phase modulation. In each case, the driver circuit 12 generates the drive signal 10 by scaling the input data signal x(t) to satisfy the voltage and current requirements of the modulator 4. The driver circuit 12 may also generate one or more bias signals (not shown) for controlling a bias point of the modulator 4 in a manner well known in the art. The amount of modulation achieved is proportional to the product of effective length of the modulator and the drive voltage applied. The length of the modulation element is fixed by the construction of the modulator, and the drive voltage is adapted to achieve the desired amount of modulation. Control circuits are generally used to achieve this adaptation.

FIG. 2 illustrates an alternative arrangement known from Applicant's co-pending U.S. patent application Ser. No. 10/677,223 filed Oct. 3, 2003. In that system, a complex driver circuit 14 comprises a digital filter 16 which uses the input data signal x(m) and a compensation function c(t) to calculate multi-bit In-Phase and Quadrature component values I(n) and Q(n) of a target optical E-field modulation. A non-linear compensator 18 uses the I(n) and Q(n) components to compute multi-bit sample streams $V_R(n)$ and $V_L(n)$. These digital sample streams are then converted into corresponding analog voltage levels by respective multi-bit digital-to-analog converters (DACs) 20, filtered (at 22) to reduce out-of-band noise, and scaled by low noise amplifiers 24 to yield a pair of drive signals $V_R(t)$ and $V_L(t)$ which are supplied to respective branches of the MZ modulator 4. If desired, respective digital filters (not shown) may be positioned between the non-linear compensator 18 and the DACs 20 in order to compensate any propagation delay differences between the DACs 20 and the MZ modulator 4.

As may be seen in FIG. 3a, an electro-optic component typically includes a control region 26 defined by a pair of electrodes 28 placed on opposite sides of an optical waveguide 30. With this arrangement, an electric field through the waveguide material can be set up by applying a voltage across the two electrodes 28. For High-speed applications (i.e. for micro-wave frequency drive signals), the electrodes 28 are typically implemented using strip-line techniques, with the drive signal v(t) supplied to the up-stream end of the electrode 28, relative to the direction of propagation of light through the waveguide 30. The opposite (downstream) end of the electrode 28 is typically terminated by a matched resistive load to ground (not shown) to prevent unwanted signal reflections. Ideally, the characteristic impedance of the electrode 28 is selected such that the drive signal propagates through the electrode 28 at the same speed as the light propagating in the optical waveguide 30.

The arrangement shown in FIG. 3a is typical of a voltage-controlled phase modulator. In such a phase modulator, the refractive index of the waveguide is a function of the applied voltage, so that light propagating though the control region 26 will experience a phase delay that is proportional to the applied voltage and the length L of the electrodes 28. In order to maximize the phase delay, the drive signal V(t) is commonly supplied as a differential signal pair ±V(t), which doubles the magnitude of the voltage across the electrodes 28.

FIG. 3b shows a dual-branch MZ modulator 4 constructed using a pair of phase modulators of the type illustrated in FIG. 3a. For simplicity, bias control circuits which are normally provided as part of the MZ modulator 4 are not shown. Voltage inverters 32 in each drive signal path convert the applied drive signals $V_x(t)$ into corresponding differential voltage pairs $±V_x(t)$. If desired, the drive signals $V_x(t)$ can be generated by the complex driver 14 described above with reference to FIG. 2.

The arrangement of FIGS. 2-3b is particularly advantageous in that the multi-bit sample values $V_R(n)$ and $V_L(n)$ can be computed taking into account non-linearities of the analog signal path (e.g. the DACs 20, filters 22 and LNAs 34) and the MZ modulator 4, such that the optical E-field of the composite signal 8 appearing at the output of the MZ modulator 4 closely matches the target E-field modulation computed by the digital filter 16. In some embodiments, the compensation function c(t) is selected to compensate impairments of an optical link not shown, in which case the target E-field modulation represents a pre-distorted signal which will be transformed by the link impairments into a substantially undistorted optical signal at a receiver end of the link.

As will be appreciated, at least the digital filter 16, non-linear compensator 18 and DACs 20 of the complex driver 14 can be implemented on a single Application Specific Integrated Circuit (ASIC). This arrangement provides advantages in terms of performance, power consumption and cost. For example, in some embodiments, an ASIC implemented using Complementary Metal Oxide Semiconductor (CMOS) technology can cost-effectively generate the analog DAC output signals to 6-bits precision at a sample rate of 20 GHz. This performance is sufficient to compensate even severe impairments of the optical link at data rates of 10 Gb/s.

However, electro-optical components such as MZ modulators are typically fabricated using techniques that are not readily compatible with those of integrated circuits (ICs). In many cases, the materials used for electro-optical components differ from those used in IC fabrication, or from the preferred technology (e.g. CMOS, GaAs etc.) of the driver IC, which would require redesign of the IC production line. Even where this is done, the drive signals V(t) required to obtain satisfactory dynamic range of the electro-optical component may significantly exceed the voltage and/or thermal limits of the IC. For example, in the system of FIG. 2, each of the drive signals $V_R(t)$ and $V_L(t)$ may require a power level on the order of 10 Watts or more.

In view of the above difficulties, the driver 12 or 14 and the optical modulator 4 are typically provided as separate packages mounted on a printed circuit board, separated by the signal conditioning components (e.g. filters and amplifiers) required to modify the drive signals output from the driver ASIC to satisfy the input power requirements of the optical modulator 4. In many cases, this is a satisfactory arrangement. However, in some applications it is desired to provide a smaller, lower power assembly.

U.S. Pat. No. 4,288,785 (Papuchon et al) teaches a digitally controlled light intensity (amplitude) modulator which is compatible with Transistor-Transistor Logic (TTL). According to Papuchon et al, each bit of an N-bit control word is used to control the voltage supplied to a respective electrode of an MZ modulator. In one embodiment, the electrodes are arranged symmetrically on both branches of the MZ modulator, and receive the same control signal. In other cases, the electrodes are arranged on one branch of the MZ modulator, while the other branch receives a feed-back signal designed to linearize the MZ modulator response. In some embodiments, the length of each electrode varies in a geometric scale according to the binary weight of its control bit. In other embodiments, each electrode has the same length, and voltage dividers are used to scale the voltage supplied to each electrode, again according to the binary weight of its control bit.

It will be appreciated that the modulator of Papuchon et al is a high voltage device designed to operate at relatively low speeds. In particular, the modulator is driven by TTL logic, which produces a 5 volt swing between binary '0' and '1' logic states. It is also well known that TTL logic is a relatively high-current and low yield technology, which precludes its use in large integrated circuits with clock speeds higher than about $10^6$ Hz. However, high speed integrated circuits, for example high speed CMOS IC's operating at clock speeds exceeding $10^9$ Hz, typically have a voltage swing on the order to 1 volt, and are capable of sourcing only very limited currents. This leads back to an assembly in which the driver IC and the optical modulator 4 must be provided as separate packages mounted on a printed circuit board, separated by the signal conditioning components (in this case high voltage drivers). In addition, the feedback loop used to linearize the sinusoidal response of the MZ modulator includes an inherent loop delay. This loop delay imposes an upper limit on the speed of the control word, beyond which the MZ modulator response will become increasingly non-linear.

Because Papuchon is considering low speed modulations with an idealized MZ modulator, he does not indicate methods to mitigate or avoid the nonidealities of an actual modulator operating at high speeds, with physical limitations and imperfect manufacturing.

Digitally driven optical modulators capable of high-speed operation are known, for example, from *A 12.5 GSample/s Optical Digital-to-Analog Converter with 3.8 Effective Bits*, A. Leven et al., Lasers and Electro-Optics Society, 2004, and references cited therein. In each case, multiple parallel phase modulators are provided, each of which is controlled by a respective drive voltage $v_i$, which appears to be scaled to follow the binary weight of a respective bit of a digital control signal so as to impose a phase shift proportional to the binary weight of that bit. The signals emerging from the parallel phase modulators are coherently combined to yield a composite amplitude modulated optical signal, the intensity of which is proportional to the value of the digital control signal.

An alternative arrangement is described in *Digital-to-analog Conversion Using Electrooptic Modulators*, Yacoubian et al, IEEE Photonics Technology Letters, Vol 15, No. 1, January 2003. In this case, multiple parallel amplitude modulators are provided. Each modulator is driven by a respective bit of a digital control signal, and attenuates light in response to the logic state of that bit. Binary-scale weighting of each amplitude modulator is obtained by using a weighted 1-to-N coupler which divides a continuous wave (CW) carrier to produce the branch signals supplied to each controlled amplitude modulator. The signals emerging from the parallel amplitude modulators are in-coherently combined on a photodetector to yield an electrical signal having an amplitude that is proportional to the value of the digital control signal.

Unlike the system of Papuchon et al, the systems of Leven et al. and Yacoubian et al are capable of operating at high speeds. The system of Yacoubian et al is also capable of operating with sub-1 volt control signals, and thus cold be driven by a high speed CMOS IC, for example. However, neither of these systems is suitable for an optical synthesizer in which the driver IC and optical modulator are integrated within a common package. In particular, the system of Leven requires a drive circuit capable of delivering a scaled voltage to each phase modulator, which precludes direct connections between the phase modulators and a driver IC. In the case of Yacoubian, the signals emerging from the optical modulators must be recombined incoherently in order to avoid errors. This precludes operation as an optical synthesizer, because it cannot reliably generate a low-error optical signal.

Accordingly, methods and apparatus enabling a high speed driver IC and an optical modulator to be integrated within a common package remain highly desirable.

SUMMARY OF THE INVENTION

Accordingly, an object of the present invention is to provide methods and apparatus enabling a driver IC and an optical modulator to be integrated on a common substrate.

Thus, an aspect of the present invention provides a A method of modulating an optical carrier. A target carrier modulation is calculated based on an input data signal. An effective length of a control region of an optical modulator is then controlled based on the target carrier modulation.

Another aspect of the present invention provides an optical synthesizer. The synthesizer includes a driver integrated circuit (IC) for computing a target carrier modulation based on an input data signal, an optical modulator co-packaged with the driver IC, and means for controlling an effective length of a control region of the optical modulator based on the target carrier modulation.

The optical synthesizer may, for example, be incorporated into a system for transmitting a data signal through an optical network. Such a system may, for example, take the form of a modem, line card, or network node incorporating such devices.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and apparatus for modulating the E-field of an optical carrier signal, in which the driver IC and the optical modulator can be integrated within a common package (i.e. co-packaged), either on a common substrate or on separate substrates closely coupled together. Embodiments of the invention are described below, by way of example only, with reference to FIGS. 4-7.

Figure 4:
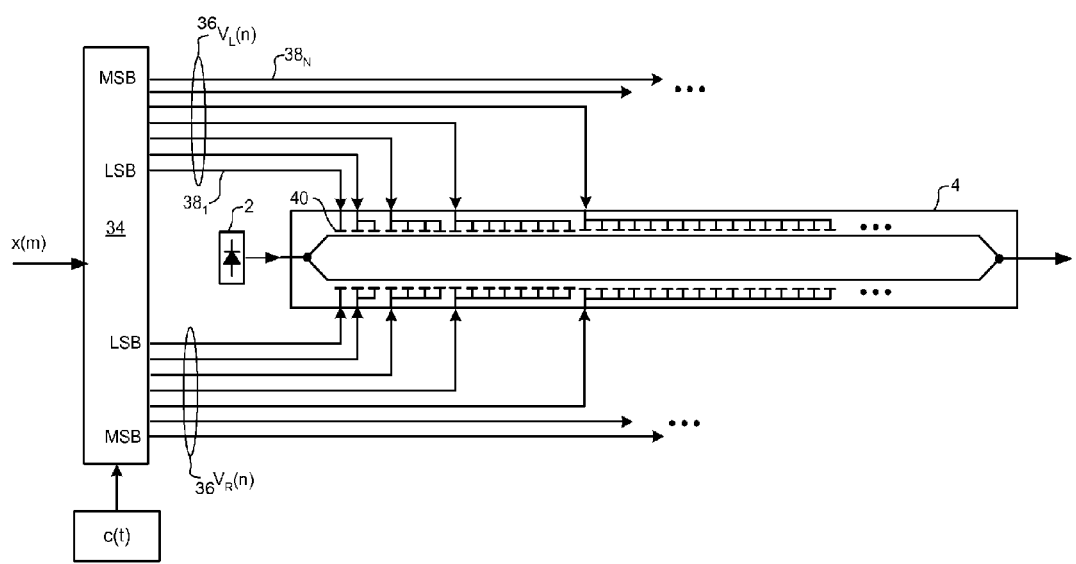
FIG. 4 schematically illustrates principal components and operation of a complex optical synthesizer in accordance with an embodiment of the present invention.

In general, the present invention operates by computing a target carrier modulation, and then varying the effective length of the control region 26 of the optical modulator in accordance with the target modulation. The electrodes of the modulator are configured such that the drive signals are the binary logic states output by the driver IC with no signal conditioning or power amplification required between the driver IC and the optical modulator. FIG. 4 illustrates a first representative embodiment of the present invention.

In the embodiment of FIG. 4, the driver IC is implemented as a digital signal processor (DSP) 34, which generates a pair of multi-bit sample streams $V_X(n)$ which are representative of the desired phase modulation to be applied to each branch of an MZ modulator 4. Advantageously, the driver IC and modulator 4 are designed to facilitate co-packaging. In some embodiments, this is accomplished by implementing both the driver IC and modulator 4 on a common substrate using the same IC technology. For example, Indium-Phosphide (InP) or Galium-Arsenide (GaAs) processes can be used to construct both the driver IC and electro optical components on a common substrate. Various known methods can be used to electrically connect the driver IC to the electro optical component, such as IC circuit traces or wire bonding.

Alternatively, the driver IC and electro optical components can be constructed on separate chips or wafers, and using respective different processes that are compatible for co-packaging. In such cases, the two components can be physically secured in either a tiled or stacked arrangement within a common package, and electrically connected using various known methods, such as wire bonding of solder balls.

With either of the above arrangements, close connection of the driver IC and electro optical components within a common package allows multiple parallel lines to be cost effectively constructed with short lengths and the precision and control needed to provide impedance matching and desired differential propagation delays.

It should be noted that the illustrated embodiments utilize an MZ modulator. However, other types of electro-optical devices may equally be controlled using the methods of the present invention. For Example, other types of interference modulators can be used. Absorption modulators, such as Electro Absorptive Modulators (EAMs) can be used, and benefit from digital precompensation of the non-ideal phase and absorption characteristics by the DSP 34. Similarly, Non-linear optical and electrical elements can be incorporated into a more complicated modulation function. Four branch, reflective, or parallel or series combinations can also be used. The source of some or all of the modulation or control can be electrical or optical.

Figure 1:
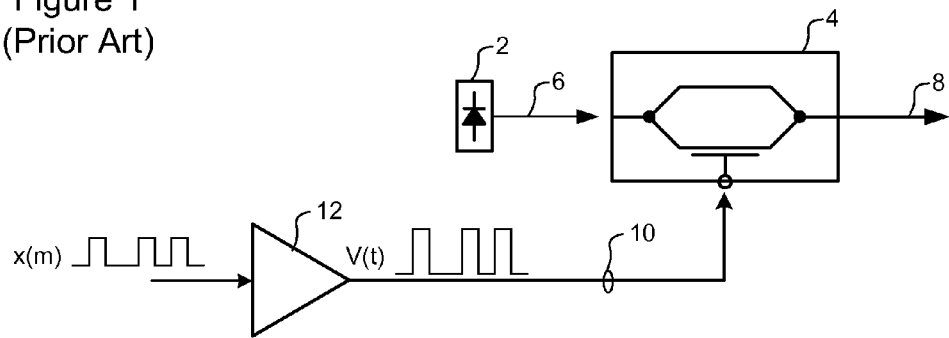
FIG. 1 schematically illustrates principal components and operation of a one-dimensional communications signal synthesizer known in the prior art.
Figure 2:
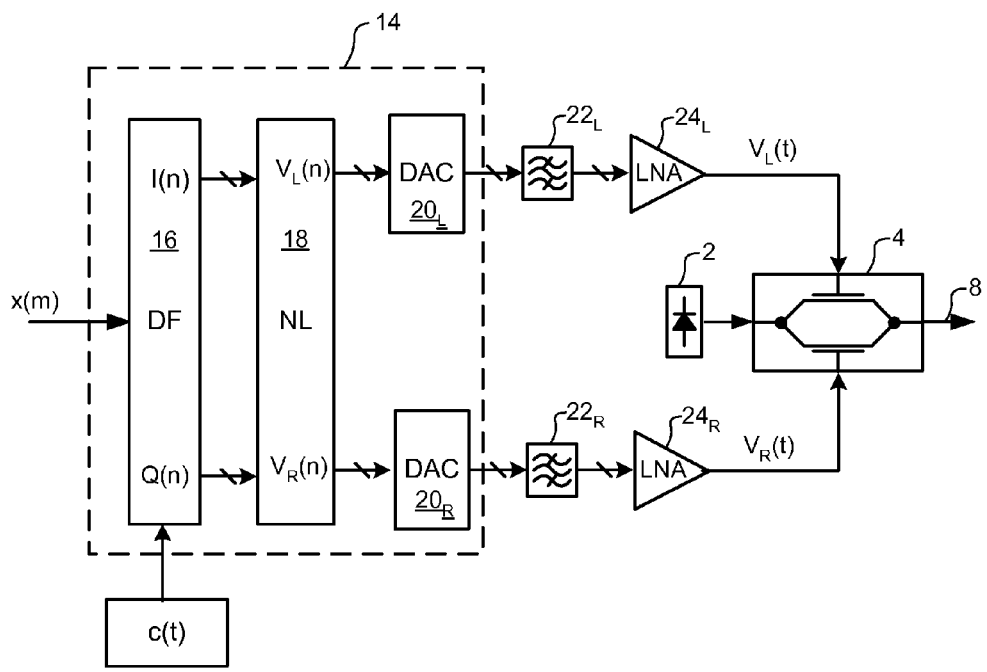
FIG. 2 schematically illustrates principal components of a complex optical synthesizer known from applicant's co-pending U.S. patent application Ser. No. 10/677,223 filed Oct. 3, 2003.

If desired, the DSP 34 may incorporate the functionality of the digital filter 16 and non-linear compensator 18 of the complex driver 14 described above with reference to FIG. 2. This arrangement is advantageous in that the digital filter 16 can be used to compute the desired target modulation, and the non-linear compensator 18 used to compensate non-linearities of the optical modulator 4. This can compensate non-ideal electrical to optical transfer functions from an electrode or electrodes, and thus at least partially compensate manufacturing variations. Each multi-bit sample stream $V_X(n)$ may be an N-bit parallel binary signal output from the DSP 34 on a corresponding N-bit data bus 36. In such a case, each line $38_i$ of the N-bit bus 36 is connected to control a number of electrodes 40 corresponding to its binary weight. For example, the least significant bit (LSB) of the of the multi-bit sample stream has a binary weight of "1", and thus controls a single electrode 40 of the MZ modulator 4. The $i^{th}$ bit has a binary weight of $2^{i-1}$, and thus controls $2^{i-1}$ electrodes 40. This arrangement would apply to embodiments in which all of the electrodes are of substantially identical length, within normal manufacturing tolerances. It is possible for at least some of the electrodes to have different lengths, provided that the current drain of each electrode remains within the limits of the driver IC. FIGS. 5 and 6 illustrate electrode connection schemes which implement this arrangement in more detail.

Figure 5A:
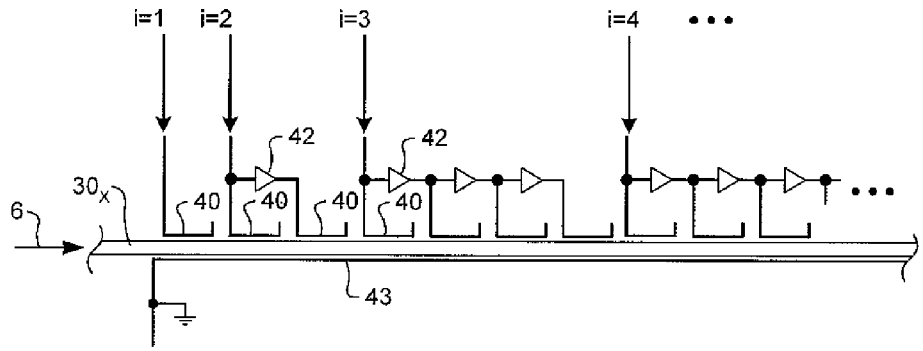
FIGS. 5a and 5b schematically illustrate a representative MZ modulator having a first electrode arrangement usable in the embodiment of FIG. 4.
Figure 5B:
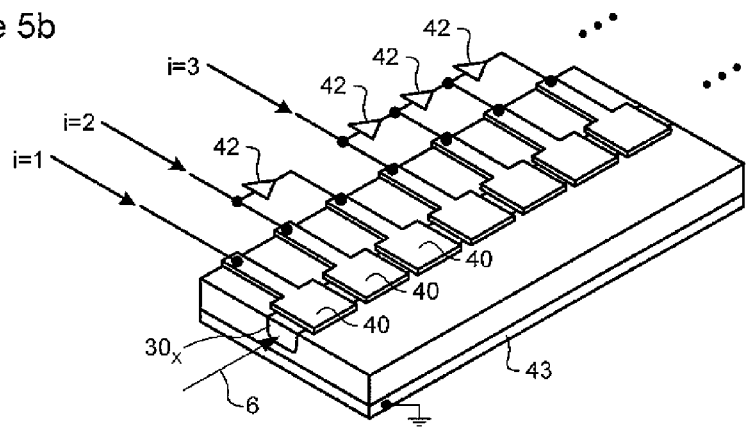
Figure 6:
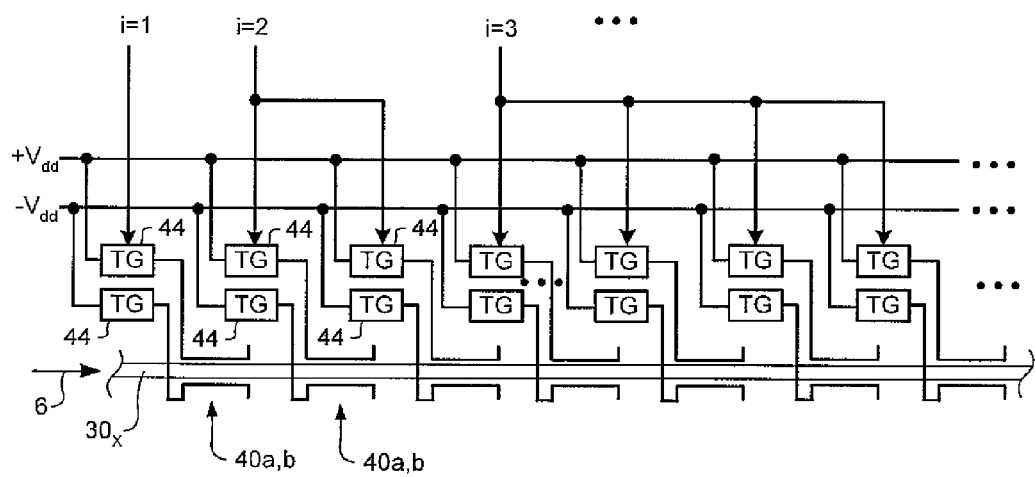
FIG. 6 schematically illustrates an alternative electrode arrangement usable in the embodiment of FIG. 4.

FIG. 5a illustrates a branch of an MZ modulator 4 (or, equivalently a variable phase modulator) having an electrode arrangement that may be used in conjunction with the complex optical synthesizer of FIG. 4. In the embodiment of FIG. 5a, each line $38_i$ of the N-bit bus 36 controls $2^{i-1}$ electrodes 40, each of which is composed of a strip-line element coupled to the data bus and terminated by a matched resistive load (not shown). Because the electrodes 40 are being driven by the driver IC output, the electrodes 40 should be designed to prevent excessive current drain. As may be seen in FIG. 5a, buffers 42 can be used both to avoid excessive current drain on the driver IC and to impose desired propagation delays between adjacent electrodes. FIG. 5b illustrates an alternative arrangement, in which the electrodes 40 are provided as un-terminated capacitive pads. In the illustrated embodiment, the capacitive pads are constructed to overlie the waveguide 30 so that an electric field can be set up through the waveguide 30 between each capacitive pad and counter electrode 43 formed by a ground plane of the wafer.

Figure 3A:
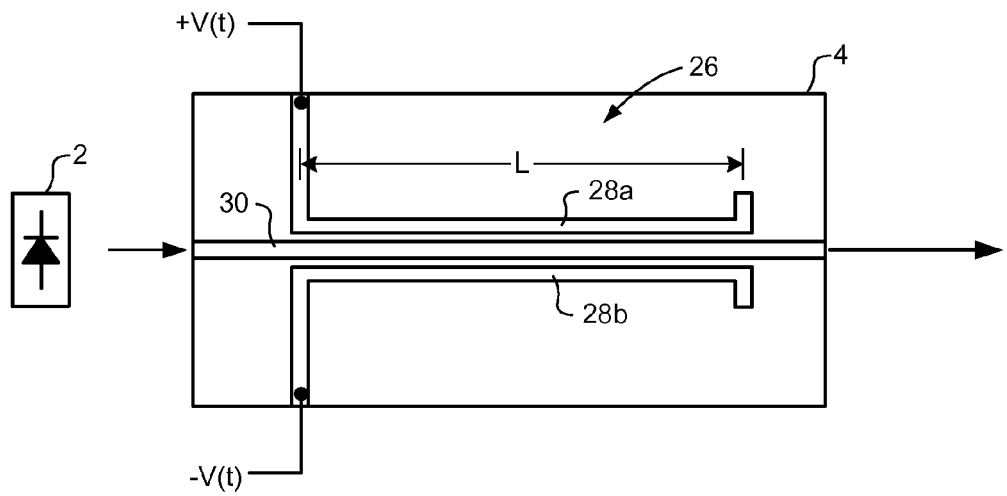
FIGS. 3a and 3b schematically illustrate respective electro-optical components.
Figure 3B:
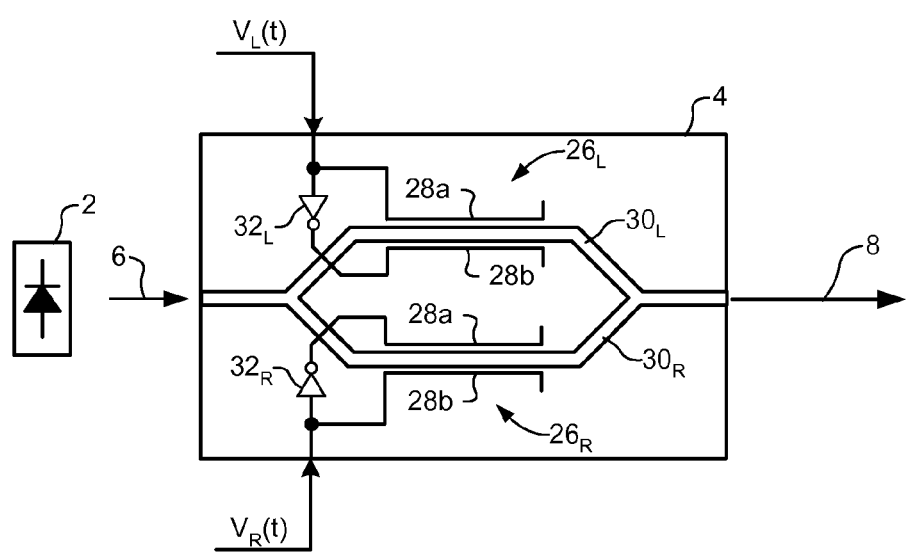

As mentioned above in reference to FIG. 3, in a conventional electro-optical component the propagation speed of the drive signal V(t) through an electrode 28 is matched as closely as possible to that of the optical signal through the waveguide 30. In the embodiment of FIG. 4, this effect can be emulated by inserting delays such that the time of arrival of each bit of the drive signal at its set of electrodes 40 coincides with the expected arrival time of an optical wave-front propagating through the waveguide 30. On a course level, this can be done by suitably setting the length of each line of the parallel data bus 36. Within each set of $2^{i-1}$ electrodes, propagation delays between adjacent electrodes can be used to accomplish the required sequential time of arrival. As mentioned previously, buffers 42 can be used for this purpose, either alone or in combination with differential signal path lengths.

The timing of drive signal bits at each set of electrodes 40 is advantageously fixed by the bus design, which determines the respective propagation delay of each bit between the driver IC and the MZ modulator 4. However, these propagation delays can be variable. For example, the delays may be set as part of a factory calibration of the driver IC/modulator package. Alternatively, a training or feed-back loop could be used to adjust line delays, either occasionally or at regular intervals.

As may be seen from FIG. 4, the number of "active" electrodes, and thus the effective electrode length within each branch of the MZ modulator 4, will vary directly with the binary value of the corresponding multi-bit sample stream $V_X(n)$. Since each active electrode receives the same voltage (corresponding to logic state '1'), it follows that the total phase delay experienced by light traversing each branch will vary directly with the number of active electrodes on that branch, and thus the value of the corresponding multi-bit sample stream $V_X(n)$.

In the embodiment of FIG. 5, the counter electrode 43 is provided by a common ground plane which extends along the entire length of each branch. This arrangement has an advantage of simplicity, and is suitable in circuits in which a differential voltage pair at each electrode 40 cannot be readily generated, for example because a negative supply voltage (i.e. −Vdd) is not available.

FIG. 6 illustrates an alternative electrode arrangement, which may be implemented in CMOS, for example, in which a pair of opposed electrodes are connected to +Vdd and −Vdd supply rails via respective transmission gates 44 (or bilateral switches). As is known in the art, each transmission gate is composed of complementary N-type and P-type MOSFETs coupled "back-to-back" in such a way that an analog signal can be switched by a common binary gate signal. Accordingly, the arrangement of FIG. 6 enables a binary control signal (having voltages of GND and +Vdd) output from the driver IC 34 to supply a corresponding differential voltage ±Vdd to the opposed electrodes 40. Other methods of generating a differential voltage pair will be apparent to those of ordinary skill in the art.

Figure 7:
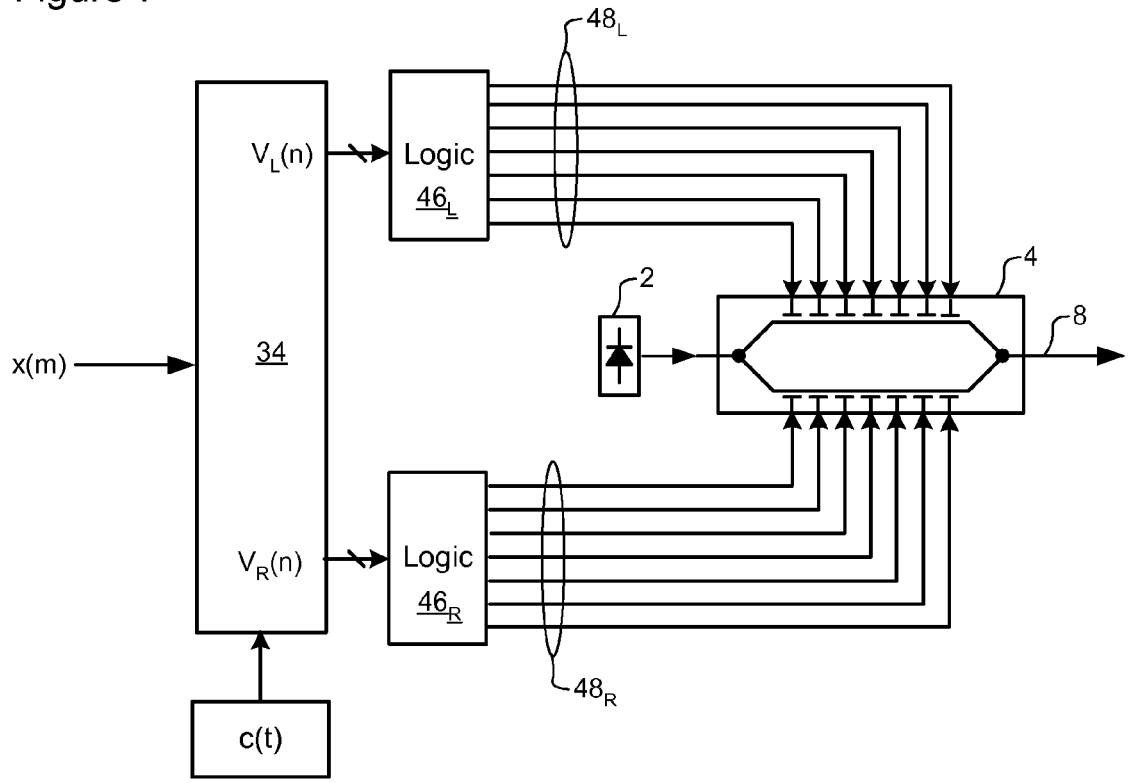
FIG. 7 schematically illustrates principal components and operation of a complex optical synthesizer in accordance with a second embodiment of the present invention.
Figure 8:
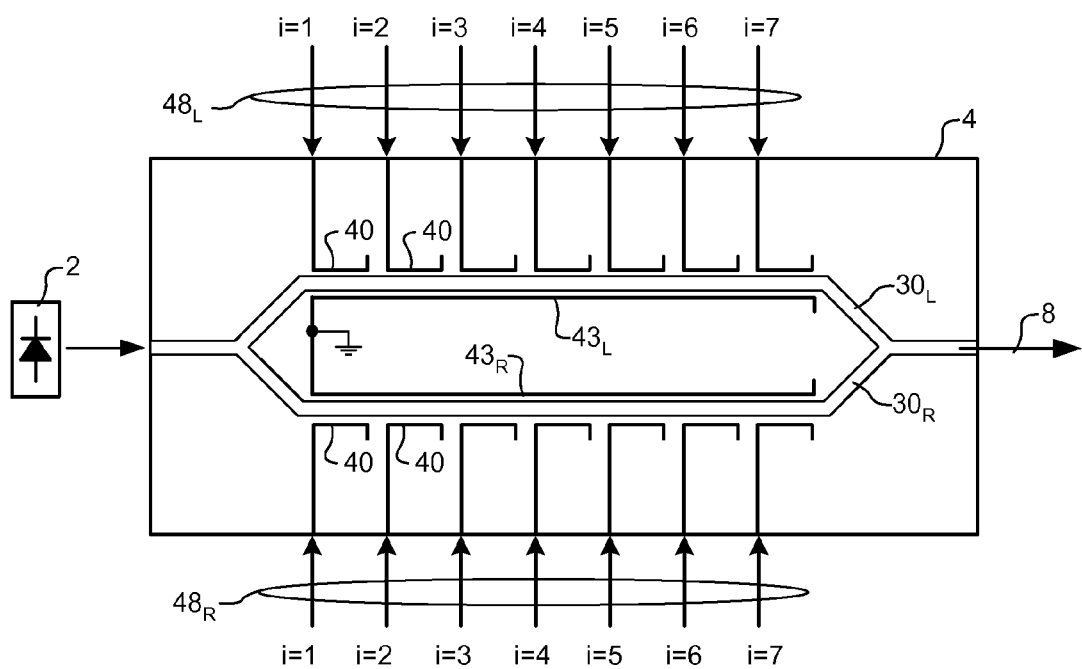
FIG. 8 schematically illustrates a representative MZ modulator usable in the embodiment of FIG. 7.

FIGS. 7 and 8 illustrate an alternative embodiment in which the driver IC is implemented as a digital signal processor (DSP) 34 cascaded with a pair of logic circuits 46. Each logic circuit 46 is designed to output a digital drive signal $S_x(n)$ to a multi-bit parallel bus 48, each line of which is connected to a respective electrode 40 of a dual-branch MZ modulator 4. Preferably, each electrode 40 is substantially identical, subject only to manufacturing variations.

If desired, the DSP 34 may incorporate the functionality of the digital filter 16 and non-linear compensator 18 of the complex driver 14 described above with reference to FIG. 2. In such cases, the DSP 34 may generate a pair of multi-bit sample streams $V_X(n)$ which are representative of the desired phase modulation to be applied to each branch of the MZ modulator 4. Each logic circuit 46 uses the binary value of each successive sample $V_X(n)$ to output a logic state '1' on the corresponding number of lines of the parallel bus 48. For example, in an embodiment in which the multi-bit sample streams $V_X(n)$ are 3 bits wide (or only the 3 most significant bits—MSBs—are used) each logic circuit 46 may implement the truth table of table 1 below.

TABLE 1

| $V_x(n)$ 3MSBs | $S_x(n)$ |
|---|---|
| 0 0 0 | 0 0 0 0 0 0 0 |
| 1 0 0 | 1 0 0 0 0 0 0 |
| 0 1 0 | 1 1 0 0 0 0 0 |
| 1 1 0 | 1 1 1 0 0 0 0 |
| 0 0 1 | 1 1 1 1 0 0 0 |
| 1 0 1 | 1 1 1 1 1 0 0 |
| 0 1 1 | 1 1 1 1 1 1 0 |
| 1 1 1 | 1 1 1 1 1 1 1 |

As may be seen from table 1, the number of "active" electrodes, and thus the effective electrode length within each branch of the MZ modulator 4 varies directly with the binary value of the corresponding multi-bit sample stream $V_X(n)$. Since each active electrode receives the same voltage (corresponding to logic state '1'), it follows that the total phase delay experienced by light traversing each branch will vary directly with the number of active electrodes on that branch, and thus the value of the corresponding multi-bit sample stream $V_X(n)$.

As will be appreciated, desired time-of arrival delays of each bit of the drive signal Sx(n) can be obtained by suitably setting the length of each line of the parallel bus 48.

FIG. 8 illustrates the MZ modulator of FIG. 7 in greater detail, for the case of simple electrodes of the type described above with reference to FIG. 5. It will be appreciated that other electrode types, such as those depicted in FIG. 6, for example, can be connected in a directly analogous manner.

The foregoing embodiments utilize a binary sequence of effective lengths, and with equal electrode lengths, but other patterns can be used. The nonlinear compensator 18 can be used to compensate for other patterns, whether deliberate, or from processing variations. For example, the nonlinear compensator 18 can be used to compensate imbalance of the MZ modulator resulting from a number of "weak" electrodes which may be produced, for example, by a manufacturing flaw.

As described above, the control of the effective length of the electrodes is most advantageously accomplished with nominally equal drive voltages. However, it is also possible to use distinct drive levels, or continuous analog drive voltages, such as from a traditional high frequency modulator driver. A mixture of these different methods can be used at once.

In the embodiments of FIGS. 4-8, separate bus lines 381 are shown for each electrode, or each set of $2^{i-1}$ electrodes, which provides maximum flexibility. However, bus lines can be bundled or coupled, for example, in order to ease implementation.

Control of the effective length of the control region 26 is advantageously obtained with selection of a plurality of electrodes by binary logic. However, logic bases other than binary can be used, if desired. The change in effective length of the control region 26 producing an electro-optic effect can be obtained by other methods, such as by controlling the path of the light or the shape of the electric field produced by one or more electrodes, or other biasing, so as to change the overlap between the electric field, the light, and the electro-optic material.

The embodiment(s) of the invention described above is(are) intended to be representative only. The scope of the invention is therefore intended to be limited solely by the scope of the appended claims.

We claim:

1. A method of modulating an optical carrier, the method comprising steps of:
   computing a multi-bit digital sample stream indicative of a target carrier modulation based on an input data signal that encodes data to be transmitted on an optical communications signal;
   providing a plurality of electrodes in operative relation to a waveguide of an optical modulator, each electrode being adapted to impose a respective predetermined modulation to light propagating within the waveguide, wherein the plurality of electrodes comprises a respective set of one of more electrodes for each bit of the multi-bit digital sample stream, the number of electrodes of each set corresponding to a binary weight of a respective bit of the digital sample stream; and
   selectively activating one or more of the electrodes in accordance with the target carrier modulation by supplying each bit of the multi-bit digital sample stream to a respective set of electrodes, wherein each bit of the multi-bit digital sample stream is differentially delayed in accordance with a propagation speed of an optical signal through the waveguide.

2. A method as claimed in claim 1, wherein the multi-bit digital sample stream comprises a respective multi-bit digital sample stream for each branch of a dual branch Mach-Zehnder (MZ) modulator, and wherein each multi-bit digital sample stream represents a corresponding branch phase modulation which will yield the target carrier modulation in a composite optical signal generated at an output of the MZ modulator.

3. A method as claimed in claim 1, wherein the step of computing the multi-bit digital sample stream comprises steps of:
   computing respective multi-bit digital values of In-phase and Quadrature components of a target optical E-field modulation; and
   computing the multi-bit digital sample stream based on the In-phase and Quadrature component values.

4. A method as claimed in claim 3, wherein the step of computing multi-bit digital values of a target optical E-field modulation comprises a step applying a compensation function adapted to compensate impairments of an optical link.

5. A method as claimed in claim 1, wherein the step of computing a multi-bit digital sample stream comprises a step of a compensating nonlinearity of the modulator.

6. A method as claimed in claim 2, wherein the step of selectively activating one or more of the electrodes comprises a step of compensating an electrode characteristic of the MZ modulator.

7. A method as claimed in claim 6, wherein the electrode characteristic comprises one or more of: electrode length; bandwidth; transfer function; and delay.

8. A method as claimed in claim 6, wherein the step of compensating the electrode characteristic is performed digitally.

9. A method as claimed in claim 6, wherein the step of compensating the electrode characteristic is performed using an analog compensation function.

10. A method as claimed in claim 6, wherein the step of compensating the electrode characteristic comprises applying a linear compensation function.

11. A method as claimed in claim 6, wherein the step of compensating the electrode characteristic comprises applying a non-linear compensation function.

12. A method as claimed in claim 1, wherein each electrode is substantially identical.

13. A method as claimed in claim 1, further comprising, for each set of electrodes, a step of delaying a time of arrival of the respective bit of the multi-bit digital sample stream to each electrode of the set, such that a time of arrival of the bit at each electrode substantially corresponds with an expected time of arrival of an optical wavefront propagating through the waveguide.

14. An integrated optical synthesizer comprising:
   a driver integrated circuit (IC) for computing multi-bit digital sample stream indicative of a target carrier modulation based on an input data signal that encodes data to be transmitted on an optical communications signal;
   an optical modulator co-packaged with the driver IC, the optical modulator comprising a waveguide and a plurality of electrodes in operative relation to the waveguide, each electrode being adapted to impose a respective predetermined modulation to light propagating within the waveguide, wherein the plurality of electrodes comprises a respective set of one of more electrodes for each bit of the multi-bit digital sample stream, the number of electrodes of each set corresponding to a binary weight of a respective bit of the digital sample stream; and
   means for selectively activating one or more of the electrodes in accordance with the target carrier modulation by supplying each bit of the multi-bit digital sample stream to a respective set of electrodes, wherein each bit of the multi-bit digital sample stream is differentially delayed in accordance with a propagation speed of an optical signal through the waveguide.

* * * * *